Dec. 10, 1957     H. W. AVERY     2,815,718
BALL PISTON TYPE FLUID TRANSMISSION
Filed July 24, 1952
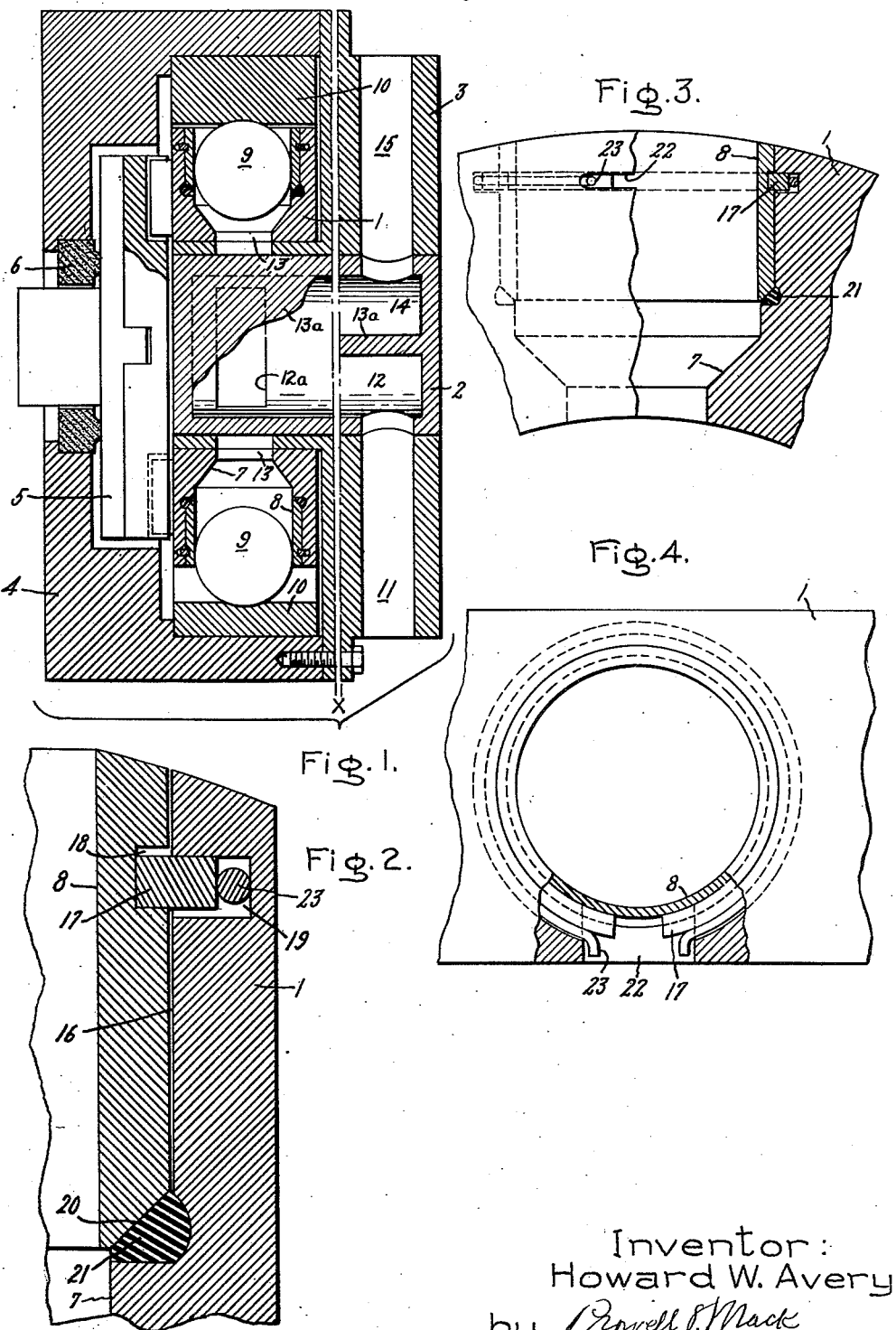
Inventor:
Howard W. Avery
by   *Powell P. Mack*
His Attorney

United States Patent Office 2,815,718
Patented Dec. 10, 1957

2,815,718

BALL PISTON TYPE FLUID TRANSMISSION

Howard W. Avery, Schenectady, N. Y., assignor to General Electric Company, a corporation of New York Application July 24, 1952, Serial No. 300,786

4 Claims. (Cl. 103—161)

My invention relates to fluid transmissions in which balls are used as pistons. These transmissions, as referred to herein are devices for the purpose of sending or receiving hydraulic liquid and may serve as pumps, motors, clutches or similar devices. The material most commonly used therein is a liquid such as oil. The particular type of transmission involved comprises a structure having one or more cylinders in each of which there is a ball piston on which reciprocating motion is imposed by a cam track having a surface which engages the ball piston and is spaced relatively to the outer end of its cylinder in the cylinder block to impart stroking movement to the ball piston upon relative movement of the track and cylinder block.

One such transmission, which may be used as a pump or motor, comprises a radial bore cylinder block mounted for rotation about an axis eccentric to a circular track surface which is located opposite the outer ends of the cylinders in the block for engaging the ball pistons therein and in which fluid is admitted to and discharged from the chambers formed in the cylinders by the ball pistons therein by a valve mechanism which is operated by the rotation of the cylinder block. If the circular track of such a device is free to rotate with the cylinder block or is driven to rotate therewith, a limited oscillatory rotation is imparted to the ball pistons. On the other hand, if the track is held stationary, the ball pistons rotate at speeds above and below an average speed depending upon the speed of rotation of the cylinder block and the size of the ball pistons. In either case, the ball pistons have a rotation imparted thereto about an axis parallel to the axis of the track ring as well as a reciprocating movement lengthwise of their cylinders.

In such devices, efficient operation requires that the clearance between each ball piston and its cylinder must be as small as possible in order to reduce fluid leakage therebetween to a small value. Furthermore, to maintain initially established clearances, the ball piston and its cylinder must be made of wear resistant materials.

However devised, in construction heretofore employed, the heat generated between the sliding and rotating ball piston and its cylinder changes conditions so that proper clearances under initial operating conditions become insufficient after the parts become heated. This leads to destructive wear at the polar areas of a ball piston at the ends of its axis of rotation and sometimes along the cylinder wall engaged by these polar areas of the ball piston during its reciprocation therein. There is also a further difficulty presented by the difference in the rates of expansion of a ball piston and its cylinder because the cylinder block, by reason of its greater heat storage capacity, does not expand at a rate comparable to that of a ball piston.

It is an object of my invention to provide an improved ball piston and cylinder arrangement for such a fluid transmission in which the parts are made of a hard wear resistant material, in which the thermal effects are equalized or substantially equalized to maintain initially established clearances, and in which polar scoring or galling of the ball pistons is eliminated without increasing clearances and resulting fluid leakage which would impair efficient operation of the assembly.

It is also an object of my invention to provide a ball piston and cylinder arrangement which may be operated at higher speeds and with high fluid pressures so that a fluid transmission embodying the same has a greater power for the same weight of material and furthermore operates with less leakage losses and consequently at high efficiencies.

Further objects of my invention will become apparent from the following description of one embodiment thereof.

In accordance with the embodiment of my invention illustrated in the accompanying drawing, the ball pistons of a fluid transmission, such as a pump or motor, roll within and slide along liners making a clearance fit with cylinder bores formed in the cylinder structure. The ball pistons and liners therefor are formed of a hard wear resistant material such as cemented carbide and the liners are mounted in the cylinder structure for free movement laterally in their cylinder bores within the limit imposed by their clearance fits in these cylinder bores. Furthermore, the heat storage capacities of each ball piston and its liner are made to be of substantially the same magnitude and the clearance fit of a liner in its cylinder bore acts as a break in the heat conduction path into the cylinder block so that the build up of heat in a ball piston and its liner is of substantially the same order of magnitude and the initially established clearance between a ball piston and its liner is consequently maintained at substantially the same value during operation of the device. The independent expansion of a liner relative to the cylinder structure in which it is mounted is accommodated by the clearance fit of the liner in the cylinder structure and its free lateral movement therein. Furthermore, the clearance between a liner and its cylinder bore in the cylinder structure permits, in response to the lateral pressure of the ball piston on its liner, a limited flattening of the liner and an increase in the clearance between the ball piston and the liner at the polar areas of the ball piston. The clearance between a cylinder liner and its cylinder bore is made less than the deformation the liner would undergo when subjected to abnormal pressures resulting from the presence of foreign matter between a ball piston and its liner so that the bore acts as a reenforcement for the liner against these abnormal pressures.

My invention will be better understood from the following description taken in connection with the accompanying drawing and its scope will be pointed out in the appended claims.

Fig. 1 of the drawing is a sectional view showing one type of ball pump or motor embodying liners having a clearance fit with their cylinder bores in accordance with my invention;

Fig. 2 is an enlarged sectional view of a portion of the cylinder block of Fig. 1 showing the clearance fit between a liner and its cylinder bore, the packing between the inner end of a liner and a wall portion of its cylinder bore, and the retaining ring arrangement for holding the liner in its cylinder bore for free lateral movement therein within the limits imposed by its clearance fit in the cylinder bore;

Fig. 3 is a side view, partly in section, showing in its entirety an enlarged view of one of the cylinders of the cylinder block of Fig. 1; and Fig. 4 is a top view, partly in section, of Fig. 3.

The fluid transmission shown in the drawing may be used as a pump or as a motor. In describing its structure it will be considered as a pump.

As shown in Fig. 1, it comprises a ring shaped cylinder block 1 which is mounted for rotation about a pintle 2 formed integrally with a cover plate 3. This cover plate is attached to a housing 4 within which the working parts of the pump are enclosed when the cover plate is in place. The structure of Fig. 1 is divided by a vertical plane of separation indicated at X through a portion of the cover plate 3. The portion of this figure to the left of the plane of separation X is shown as it would appear when rotated 90° with respect to the portion to the right of the plane of separation X for the purpose of more clearly showing the structure and operation as more fully described below. The cylinder block is driven by an input shaft, not shown, whose end is keyed in a socket formed in the outer disk of an Oldham coupling 5 whose inner disk is connected to the cylinder block. This coupling provides for any lack of alignment between the axes of rotation of the input shaft and of the cylinder block. A packing 6 between housing 4 and the outer disk of coupling 5 prevents leakage of oil from the pump casing where this driving connection extends into the casing formed by the housing 4 and cover plate 3.

The cylinder block is provided with a plurality of radial cylinder bores 7 each of which is provided with a liner 8 having a clearance fit with the cylinder bore in which it is located. A ball piston 9 is located in each cylinder and makes a close running fit with its liner 8 therein. These ball pistons engage the grooved innner circular surface of a track ring 10 which is seated in housing 4 and located opposite the outer ends of the cylinder 8 in the cylinder block. It is to be noted that the center of the ball engaging surface of the track ring is eccentric to the center of rotation of the cylinder block 1 about pintle 2. Conusequently, as the cylinder block rotates, the ball pistons 9, which are held against the track 10 by centrifugal force, or by inlet oil pressure in the cylinders, are caused to reciprocate in their cylinders due to the eccentricity of the track surface along which they roll. It is also to be noted that each ball piston rotates about an axis parallel to the axis of the track ring 10 and it is this rotation which causes the polar scoring or galling of the ball piston and which is eliminated by my invention.

Oil is admitted to and discharged from the pump through a valve mechanism which will now be described. Cover plate 3 is provided with an inlet passage 11 which extends through pintle 2 by way of a cavity 12 having a width less than half the circumferential bearing surface of the pintle and which communicates with ports 13 leading to each cylinder bore of the cylinder block as the cylinder block rotates about the pintle. This communication from the cavity 12 to the ports 13 is accomplished by means of a slotted opening 12a on the side of the pintle enclosing the cavity 12. The arrangement is such that as ball pistons 9 move outwardly during a suction stroke, oil is supplied to their cylinders through passage 11, cavity 12, slotted opening 12a and ports 13. When ball pistons 9 are forced inwardly during a pressure stroke, ports 13 of their cylinders match with another slotted opening (not shown) corresponding to opening 12a but serving another cavity 14 formed in the other side of the pintle opposite cavity 12 and oil under pressure is discharged through ports 13, the slotted opening serving cavity 14 in pintle 2, cavity 14 and the exhaust passage 15 formed in the cover plate 3 of which the pintle forms a part. The portion of the pintle 2 forming a partition between cavities 12 and 14 is indicated in the drawing at 13a. There are of course two transition points in each revolution of the cylinder block, corresponding to each end of the stroke of a ball piston, when port 13 of its cylinder passes along the surface of pintle 2 between the slotted openings serving intake cavity 12 and exhaust cavity 14. The ball pistons 9 visible in Fig. 1 are both at these transition points. The ball piston shown at the top of this view is about to begin its intake stroke, and that shown at the bottom of the view is about to begin its exhaust stroke. As mentioned above, the portion of Fig. 1 to the left of the vertical plane of separation indicated at X is shown as though rotated 90° with respect to the portion shown to the right of the plane of separation X. As indicated, the direction of this rotation of the left portion with respect to the right portion would be such that the left portion constitutes a view of the lower half of the structure, as viewed from above, when related to the right portion. The direction of rotation of the cylinder block 1 as shown, would be such that the lower ball piston is advancing toward the observer and the upper ball piston is receding away from the observer. It will be understood from the above description that oil flows continuously from passageway 11 to passageway 15.

As previously stated, each liner 8 makes a clearance fit with its cylinder bore in cylinder block 1 and is mounted for free lateral movement in its cylinder bore within the limit imposed by its clearance fit therein. The arrangement is best shown in the enlarged sectional view of Fig. 2 where the clearance fit has been illustrated at 16. As shown there, each liner 8 is held in place in its cylinder bore by a split retaining ring 17 which, when the parts are assembled, is located in and engages locking grooves 18 and 19 formed respectively in the opposed walls of a liner and its cylinder bore. The inner end of each liner 8 has an outwardly beveled portion 20 which engages a packing 21 which is seated in a grooved wall portion of the cylinder bore for the liner. This packing is preferably made of a heat resistant material such as silicone rubber or the like. It serves as a barrier against leakage of oil from the cylinder through the clearance fit between its liner and the cylinder bore in which the liner is located. Each retaining ring 17 has a spring bias into engagement with the bottom surface of its locking groove 18 in its associated linear 8 which upon assembly of this liner in its cylinder bore is located opposite the locking groove 19 formed therein and which is deep enough to accommodate the ring upon insertion of the liner in its cylinder bore when the beveled inner end thereof engages and opens the ring for the passage of the liner into its cylinder bore. It will be noted that locking grooves 18 and 19 are wider than retaining ring 17 so that upon assembly each ring is seated against one of said liners and its associated cylinder bore by engaging opposite side walls of the grooves under the bias imparted by packing 21 acting against the beveled end 20 of a liner.

The liners are removable and may be replaced when worn to an extent requiring this. To permit such replacements, windows 22 are placed in the cylinder block opposite locking grooves 19 for retaining rings 17. As shown in Figs. 3 and 4, these windows uncover the ends of retaining rings 17 so that a tool may be introduced through the windows to engage and separate the ends of the split retaining rings 17 and thus spreading them out of locking grooves 18 in liners 8. When rings 17 are thus retracted, liners 8 may be withdrawn from their cylinder bores 17. In order to guard against displacement of the retaining rings due to wear or breakage, I preferably insert a locking wire 23 in the space between each ring 17 and its locking groove 19. The ends of these locking wires are bent over as shown in Fig. 4 to hold them in place.

When the fluid transmission just described acts as a pump, each ball piston during its pressure stroke exerts a lateral pressure on the back side wall area of its cylinder liner. Due to the clearance between a liner and its cylinder bore, it is flattened slightly by this pressure and consequently increases its clearances with the ball piston therein at the polar areas thereof at each end of its axis of rotation. This added clearance between the ball piston and its liner prevents scoring and galling at these polar areas heretofore experienced in constructions not embodying my invention. Also, apparently the total leakage between a ball piston and its liner is decreased due to this flattening action and this is an added advantage since it improves the efficiency of the pump. Furthermore, this increased clearance at the polar areas of a ball piston also facilitates passage of dirt particles if such be present in the oil. The clearance fit of a liner in its cylinder bore is such, however, as to limit the deformation of a liner by providing a reenforcement therefor when it is subjected to an abnormal force such as occasioned by the presence of foreign matter between a ball piston and its liner. This is of importance since the liners are made of a hard wear resistant material which is usually deficient in tensile strength.

In practicing my invention, I have used ball pistons and liners made of cemented carbide formed of finely divided tungsten carbide particles held together with cobalt. Such material is very hard and has a high resistance to wear. These parts are finished by grinding and are held to very close tolerances. In grinding grooves 18 in liners 8, the corners thereof are rounded so as to avoid any notch weakness at these points. In a 7/8 inch ball pump, the tolerance of a ball piston is held to plus or minus 25 millionths of an inch and the inside diameter of its sleeve to 30 millionths of an inch with the out of roundness or straightness limited to the same value. The clearance fit of a sleeve in its cylinder bore is at least 5 ten thousandths of an inch but due to permitted tolerances may be as great as 12 ten thousandths of an inch.

There will of course be variations in the tolerances and clearances employed in practicing my invention depending on the size of the parts employed. Thus, the diametrical clearance between a liner and its cylinder bore may range from one thousandth of an inch for a 2 inch ball piston to 5 ten thousandths of an inch for a 5/8 inch ball piston and the diametrical clearance between a ball piston and its liner may range from one thousandth of an inch for a 2 inch ball piston to 25 hundred thousandths of an inch for a 5/8 inch ball piston.

As previously stated, the liner and its ball piston are made to have substantially the same heat storage capacity so that their expansion due to heating will be of substantially the same order of magnitude and the initial clearance will remain substantially the same during long continued operation of the pump. The clearance fit of a liner in its bore acts as a break in the heat conduction path into the cylinder block so that the effect of the greater heat storage capacity of the cylinder block does not exist as in previously used constructions. Furthermore, the clearance fit between a liner and its bore permits expansion of the liner independently of its cylinder block and thus prevents seizure of a ball piston in its liner.

Some appreciation of the advantages of my invention will become apparent from the following example. A pump using cemented carbide ball pistons 7/8 of an inch in diameter in a 9 cylinder bore block of nitralloy rotated at 3600 revolutions per minute developed 20 hydraulic horsepower at an oil pressure of 1500 pounds per square inch. With no other change except the employment of cemented carbide liners in accordance with my invention the same pump could be operated at 5400 revolutions per minute with an oil pressure of 3000 pounds per square inch to develop 66 hydraulic horsepower. Furthermore, a pump embodying my invention operated without scoring or galling of the ball pistons at their polar areas for reasons pointed out above.

The above considerations of the operation of the device of the drawing as a pump, also apply when it is operated as a motor. As a motor, however, each ball piston exerts a lateral pressure on the inside front wall area of its cylinder liner since rotation of the cylinder block will be reversed if the inlet and outlet oil pressures remain the same.

The benefits of my invention are also obtained in arrangements other than that described but where the ball pistons rotate and reciprocate in their cylinders as in the embodiment just described. This is true whether the race for the ball pistons is stationary as in the structure above described, is supported for free rotation with the cylinder block, or is driven as is the cylinder block. Furthermore, my invention is not limited to arrangements embodying radial cylinders since the same problem and its solution applies equally to arrangements in which the axes of the cylinders are parallel to the axis of rotation of the block in which they are formed and in which a track ring for the balls is located at one or both ends of these cylinders. Furthermore, the track ring need not have a circular ball engaging surface since any suitable cam surface may be employed for imparting one or more strokes to a ball piston for each revolution of the cylinder block.

It is consequently apparent that my invention may be applied in various ways other than the particular one described above for the purpose of disclosing the same. Therefore, while I have described a particular embodiment of my invention, it will be obvious to those skilled in the art that many changes may be made without departing from my invention in its broader aspects and I intend in the appended claims to cover all such changes and modifications thereof which fall within the true spirit and scope of my invention.

What I claim as new and desire to secure by Letters Patent of the United States is:

1. A fluid transmission comprising a structure having a cylinder bore, a liner having a clearance fit with said cylinder bore, means for mounting said liner for free movement laterally in said cylinder bore within the limit imposed by the clearance of its fit in said cylinder bore, a ball piston making a rolling and sliding fit in said liner, means, including a track making a rolling engagement with said ball piston, for imposing reciprocating motion on said ball piston in said cylinder bore, and a valve for controlling the supply and discharge of fluid to and from the chamber defined by said ball piston and said liner, said ball piston and said liner being comprised of tungsten carbide particles cemented together with cobalt and the clearance between said liner and said cylinder bore in said structure being sufficient to accommodate the independent heat expansion of said liner relative to said cylinder bore.

2. A fluid transmission comprising a cylinder block, radial cylinder bores in said block, deformable liners each making a clearance fit with one of said cylinder bores and each having an outward beveled inner end portion, a packing between the beveled inner end portion of each of said liners and a wall portion of its said cylinder bore, split retaining rings for holding said liners in said cylinder bores against said packings and for free lateral movement limited by the clearance between said liners and said cylinder bores, each said retaining ring having a spring bias into engagement with the bottom surface of a locking groove in its associated liner which upon assembly of said liner in its cylinder bore is located opposite a locking groove therein which is deep enough to accommodate said ring upon the insertion of said liner in said cylinder bore when the beveled end thereof engages and opens said ring for the passage of said liner into its said cylinder bore, a ball piston in each of said liners with which it makes a rotating and sliding fit, a stroking ring engageable by said ball pistons and having a circular track portion opposite the outer ends of said cylinder bores in said cylinder block, a pintle whose axis is eccentric with respect to said circular track portion of said stroking ring, and means for rotating said cylinder block about said pintle, said pintle and said cylinder block having ports movable relatively to one another by said rotation of said cylinder block for controlling the supply and discharge of fluid to and from the chambers defined by said ball piston in said liners.

3. A fluid transmission having a reciprocating ball piston making a rolling and sliding contact with a cylinder liner having a beveled inner end and a side wall clearance fit with a cylinder bore therefor in a supporting structure for said liner, said liner having a packing between its inner end and said cylinder bore, retaining means for holding said liner in said cylinder bore against said packing and for free lateral movement between said liner and said cylinder bore, said ball piston and said liner both being comprised of tungsten carbide, and the clearance between said liner and said cylinder bore in said structure being sufficient to accommodate the independent heat expansion of said liner relative to said cylinder bore.

4. A fluid transmission having a reciprocating ball piston making a rolling and sliding contact with a cylinder liner having a side wall clearance fit with a cylinder bore serving as a supporting structure for said liner, said liner having a packing between its inner end and said cylinder bore, retaining means for holding said liner in said cylinder bore against said packing and for free lateral movement between said liner and said cylinder bore, said ball piston and said liner both being comprised of wear-resistant material having thermal characteristics which enable the maintenance of initially established clearances, and the clearance between said liner and said cylinder bore in said structure being sufficient to accommodate the independent heat expansion of said liner relative to said cylinder bore.

References Cited in the file of this patent
UNITED STATES PATENTS

| | | |
|---|---|---|
| 2,246,392 | Spreng et al. | June 17, 1941 |
| 2,429,011 | Wylie | Oct. 14, 1947 |
| 2,496,547 | Lankford | Feb. 7, 1950 |
| 2,530,246 | Kirkpatrick et al. | Nov. 14, 1950 |
| 2,547,224 | MacGuire | Apr. 3, 1951 |
| 2,617,401 | Rippingille | Nov. 11, 1952 |
| 2,671,703 | Laraque | Mar. 9, 1954 |
| 2,683,638 | Noble | July 13, 1954 |
| 2,686,091 | Young | Aug. 10, 1954 |
| 2,696,413 | Wheildon | Dec. 7, 1954 |

FOREIGN PATENTS

| | | |
|---|---|---|
| 124,069 | Great Britain | 1919 |